(12) United States Patent
Sanoner

(10) Patent No.: US 6,868,620 B2
(45) Date of Patent: Mar. 22, 2005

(54) DIGITAL MEASURING INSTRUMENT HAVING FLEXIBLE MEASURING LINE

(75) Inventor: Hughes Sanoner, Hong Kong (CN)

(73) Assignee: Solar Wide Industrial, Ltd. (HK)

( * ) Notice: Subject to any disclaimer, the term of this patent is extended or adjusted under 35 U.S.C. 154(b) by 0 days.

(21) Appl. No.: 10/210,291

(22) Filed: Aug. 1, 2002

(65) Prior Publication Data

US 2004/0040170 A1 Mar. 4, 2004

(51) Int. Cl.[7] ............................................. G01B 3/10
(52) U.S. Cl. ............................. 33/763; 33/756; 33/769
(58) Field of Search .......................... 33/762, 763, 756, 33/755, 759, 761, 767, 768, 769, 770

(56) References Cited

U.S. PATENT DOCUMENTS

| | | | |
|---|---|---|---|
| 2,553,613 A | * | 5/1951 | True ............................ 33/762 |
| 3,579,836 A | | 5/1971 | Kraus |
| 3,780,440 A | * | 12/1973 | Taylor ......................... 33/756 |
| 3,812,589 A | * | 5/1974 | Schultheis ................... 33/756 |
| 3,973,326 A | | 8/1976 | Gallacher et al. |
| 4,031,360 A | * | 6/1977 | Soule, Jr. ..................... 377/24 |
| 4,143,267 A | | 3/1979 | Johnson et al. |
| 4,161,781 A | | 7/1979 | Hildebrandt et al. |
| 4,186,490 A | * | 2/1980 | Quenot ........................ 33/762 |
| 4,189,107 A | * | 2/1980 | Quenot et al. ........... 242/390.1 |
| 4,242,574 A | | 12/1980 | Grant |
| 4,282,571 A | | 8/1981 | Giovannoli et al. |
| 4,316,081 A | * | 2/1982 | Washizuka et al. ........... 377/18 |
| 4,328,618 A | | 5/1982 | Belanger |
| 4,413,416 A | | 11/1983 | Ernst |
| 4,473,952 A | | 10/1984 | Mariani |
| 4,506,446 A | * | 3/1985 | Mitchell ..................... 33/762 |
| 4,530,157 A | | 7/1985 | Nelle |
| 4,532,709 A | * | 8/1985 | Leumann et al. ............. 33/763 |
| 4,551,847 A | * | 11/1985 | Caldwell .................... 377/24 |
| 4,575,944 A | * | 3/1986 | Lin ............................ 33/762 |
| 4,584,773 A | | 4/1986 | Rieder et al. |
| 4,611,402 A | * | 9/1986 | Yamamoto et al. ........... 33/762 |
| 4,642,899 A | * | 2/1987 | Fass et al. .................... 33/760 |
| 4,731,930 A | | 3/1988 | Miller |
| 4,768,290 A | * | 9/1988 | Cooper ........................ 33/756 |
| 4,779,212 A | * | 10/1988 | Levy .......................... 702/164 |
| 4,941,267 A | | 7/1990 | Miller, Jr. |
| 5,027,526 A | | 7/1991 | Crane |
| 5,035,064 A | * | 7/1991 | Care ........................... 33/760 |
| 5,036,597 A | | 8/1991 | Falkinger et al. |
| 5,060,394 A | | 10/1991 | Lincoln et al. |
| 5,142,793 A | | 9/1992 | Crane |
| 5,286,972 A | | 2/1994 | Falk et al. |
| 5,345,691 A | | 9/1994 | Falk et al. |
| 5,363,565 A | | 11/1994 | Kaneko |
| 5,386,643 A | * | 2/1995 | Corcoran .................... 33/762 |
| 5,426,863 A | | 6/1995 | Biggel |
| 5,433,014 A | | 7/1995 | Falk et al. |
| 5,628,120 A | | 5/1997 | Sergenius |
| 5,718,056 A | * | 2/1998 | Miyasaka et al. ............. 33/761 |
| 5,768,797 A | * | 6/1998 | Trevino ....................... 33/761 |
| 6,357,133 B1 | * | 3/2002 | Hsu ............................ 33/755 |

\* cited by examiner

*Primary Examiner*—G. Bradley Bennett
*Assistant Examiner*—R. Alexander Smith
(74) *Attorney, Agent, or Firm*—Lerner, David, Littenberg, Krumholz & Mentlik, LLP

(57) ABSTRACT

A digital measuring instrument includes a housing containing a measuring line, a rotatable drum engaging the line whereby movement of the line causes rotation of the drum, a storage spool mounted in the housing for storing the line, a crank assembly for rotating the storage spool for winding the measuring line about the storage spool, and a rotatable disc that rotates simultaneously with the measuring drum. The instrument includes an optical sensor in communication with the rotatable disk for compiling data related to rotation of the disk, and electronic circuitry in communication with the optical sensor for calculating a length of the line drawn from the housing. The housing has a well for receiving the storage spool and a side cover with a slideable lock for covering the well.

35 Claims, 16 Drawing Sheets

US 6,868,620 B2

DIGITAL MEASURING INSTRUMENT HAVING FLEXIBLE MEASURING LINE

FIELD OF THE INVENTION

The present invention is related to tape measures used for measuring distances and is specifically related to electronic tape measures.

BACKGROUND OF THE INVENTION

Tape measures have been used for many years to accurately measure distances between two points and the lengths of objects. Tape measures typically include a housing having an opening through which a measuring tape is drawn. The measuring tape has indicia printed thereon that are used to measure distances. When measuring a distance, the measuring tape is unwound from a storage spool as it is drawn through the opening of the housing. When the measuring task is complete, the measuring tape is rewound onto the storage spool.

In recent years, electronic tape measures have been developed which electronically track the length of a measuring tape unwound from a storage spool. Electronic tape measures typically include a reading element in communication with the storage spool that generates electric pulses corresponding to the length of the measuring tape drawn from the spool. The electric pulses are counted by operational circuitry, which converts the pulses into a digital readout provided on a visual display.

One electronic tape measure is disclosed in U.S. Pat. No. 5,142,793 to Crane which teaches a housing, a reel located within the housing and a measuring tape wound on the reel. The measuring tape is extendable through an opening in the housing as the reel is unwound. A first measuring element is associated with the reel for generating incremental measuring data and a second measuring element generates absolute measuring data as the measuring tape is extended. A processor responsive to both the incremental measuring data and the absolute measuring data generates an output that reflects the linear extension of the measuring tape from the housing. The device also includes a visual display for showing information related to the linear extension of the measuring tape.

U.S. Pat. No. 5,426,863 to Biggel discloses a combination tape measure and calculator. The tape measure includes a measuring tape having equally spaced holes along the length thereof. The holes are read by closely spaced optical readers arranged to generate incremental unit signals that are transmitted to a microprocessor mounted in a case.

U.S. Pat. No. 5,433,014 to Falk et al. discloses a digital tape measure including a transmitter for transmitting measurements to a remote location. The tape measure includes a housing, a measuring tape having a series of optical markings, an optical sensor for sensing the optical markings when the tape is extended or retracted, a logic circuit in communication with the optical sensor for providing a digital signal representative of the length of the tape drawn from the housing, and a transmitter connected to the logic circuit for transmitting the digital signal to the remote location. A receiving unit is provided at the remote location for receiving, storing and displaying the measurements.

U.S. Pat. No. 5,286,972 to Falk et al. discloses a photoelectric measuring device with a digital display. The measuring device measures distance by optically scanning the length of a line as it is unwound from a reel. The line is provided with a plurality of dye marks placed at spaced intervals. The dye marks are detected by an optical sensor in communication with a circuit that maintains a count indicative of the length of the line. The count is displayed on an LED display.

The above-described devices generally use measuring tapes having a substantial width and thickness that limits the length of tape, such as 100 meters or less, that can be conveniently stored on a single spool. Tape measures having distances of over one hundred meters are rare because longer tapes will substantially increase the overall size of the tape measure housing, thereby making the tape measure extremely bulky and burdensome to operate.

Another problem with conventional tape measures relates to maintenance and replacement costs. Tape measures are frequently damaged because they are used in harsh environments resulting in the measuring tape being damaged. A damaged measuring tape cannot accurately measure a distance or cannot be rewound onto a storage spool. As a result, the measuring tape must be repaired or replaced at substantial cost. In many instances, a brand new tape measure must be purchased.

Another problem relates to the accuracy of electronic tape measures. Many conventional electronic tape measures are inaccurate or unreliable because they don't account for the hanging radius of the measuring tape on the storage spool as the tape is unwound from the storage spool.

Thus, there is a need for an electronic tape measure that enables users to measure longer distances. There is also a need for a durable electronic tape measure, which allows the measuring element extended from a housing to be easily replaced, at low cost. There is also a need for an electronic tape measure that is accurate and reliable.

SUMMARY OF THE INVENTION

In accordance with certain preferred embodiments of the present invention, a digital tape measure includes a housing containing a rotatable storage spool, and a measuring line windable about the storage spool. The tape measure also preferably includes a measuring drum rotatably mounted in the housing and including a surface in contact with the measuring line, whereby movement of the measuring line causes rotation of the measuring drum. A disc is desirably coupled with the measuring drum, whereby rotation of the measuring drum due to movement of the measuring line causes simultaneous rotation of the disc. The digital tape measure also includes an optical sensor in communication with the disc for compiling data related to rotation of the disc, and electronic circuitry in communication with the optical sensor for processing the compiled data so as to calculate a length of the measuring line drawn from the housing. The housing preferably includes a visual display, such as a digital display, adapted to show the calculated length of the measuring line that has been drawn from the housing.

The disc is preferably a circular disc that is rotatable about a shaft. The shaft preferably links the disc with the rotatable measuring drum. The disc preferably includes a peripheral edge having a plurality of evenly spaced teeth. The teeth desirably define evenly spaced gaps therebetween. When the disc is inserted into the housing of the digital tape measure, the teeth of the disc are preferably in substantial alignment with the optical sensor. As a result, the rotating teeth are in alignment with the optical sensor.

The optical sensor of the present invention desirable includes a light generating element such as a light emitting diode, directed toward a first face of the rotating disc, and a light sensing element, such as a photo sensor, directed toward a second face of the disc. The light-generating element and the light sensing element preferably oppose one another and are in substantial alignment with one another. As the disc rotates, the optical sensor generates a first signal when the light from the light generating element reaches the light sensing element. When the disc rotates so that one of the teeth is aligned between the light generating element and the light-sensing element, the optical sensor generates a second signal indicating such a condition. As a result, the optical sensor generates a first pulse signal when light from the light generating element passes through one of the gaps between the teeth of the disc to reach the light sensing element, and a second pulse signal when light from the light generating element is blocked from reaching the light sensing element by one of the teeth of the disc.

The digital tape measure desirably includes a printed circuit board including electronic circuitry in communication with the optical sensor. The electronic circuitry is selected from the group consisting of analog circuitry and digital circuitry. The printed circuit board also preferably includes one of more microprocessors having one of more subroutines stored therein for operating the electronic circuitry. The electronic circuitry preferably operates in conjunction with software that enables a user to re-calibrate the unit for different types of line diameters and/or line materials. The calibration data is permanently stored in memory, even when battery power is out and even if battery power is not used. As a result, a user may change the measuring line to use a line having a different diameter or material, and then re-calibrate the unit to work accurately with the new measuring line. In certain preferred embodiments, the software is adapted to count pulses for a predetermined length of measuring line that passes the optical sensor. In one particular preferred embodiment, the software is adapted to count two (2) pulses for each 1 mm (0.04") of measuring line, thereby ensuring maximum precision and accuracy.

The measuring line drawn from the storage spool is preferably flexible. In certain preferred embodiments, the measuring line is made from a material selected from the group consisting of cotton, metal and synthetic materials such as nylon and polyester. In one preferred embodiment, the measuring line is string. In another preferred embodiment, the measuring line is made of stainless steel. The measuring line is wound about the storage spool and has a length of approximately 750 to 1500 meters. Although not limited by any particular theory of operation, it is believed that using a measuring line, as opposed to a wide measuring tape, enables a longer length of measuring material to be wound about a storage spool. As is well known to those skilled in the art, a conventional measuring tape has substantial thickness and width that occupies a substantial amount of space on a storage spool. This dramatically limits the length of measuring tape that may be stored in a hand carried tape measure. In contrast, the present invention provides an elongated, flexible measuring line that has minimal width and thickness. As a result, a substantially longer length of material may be wound about a storage spool, thereby maximizing the distance that can be measured using the present invention.

In certain preferred embodiments, the housing includes a hingeable front cover having a button that may be depressed for allowing the front cover to be swung from a closed position to an open position. In the open position, an interior region of the housing may be accessed. The present invention also desirably includes a crank assembly including a crank handle. The crank assembly is coupled with the storage spool for providing an element for rewinding the measuring line about the storage spool.

In certain preferred embodiments, the housing includes a well adapted to receive the storage spool and a removable cover securable over the well. The side cover includes a lock for selectively uncovering the well. As a result, a storage spool having worn or damaged measuring line wound about it may be replaced with another storage spool having new or repaired measuring line. Thus, the removable side cover enables a replacement storage spool with measuring line to be quickly and easily installed in the housing.

The present invention also preferably includes a measuring drum assembly including the measuring drum, whereby the measuring drum is mounted on a shaft carrying a first gear that is mechanically coupled with the rotating disc in communication with the optical sensor. The measuring line is threaded through the measuring drum assembly so that movement of the measuring line causes simultaneous rotation of the measuring drum. Due to the gear and shaft linkages described above, rotation of the measuring drum causes simultaneous rotation of the disc. In certain preferred embodiments, the measuring drum includes at least one stationary guide, at least one roller guide, and at least one cleaner guide for cleaning an exterior surface of the line. For example, if the measuring line is made of cotton, the cleaner guide may remove extraneous matter present at an outer surface of the measuring line. Thus, the measuring drum assembly defines a threaded path for the measuring line as the measuring line passes between the storage spool and the opening in the hingeable front cover of the housing. The measuring drum assembly preferably maintains at least a section of the measuring line in non-slip engagement with the surface of the measuring drum, and maintains the measuring line under tension. As used herein, the term "non-slip surface" means that there will be no slippage between movement of the measuring line and the outer annular surface of the measuring drum.

Other preferred embodiments of the present invention disclose an electronic measuring device having a flexible measuring line including a housing having an opening for the measuring line, a storage spool rotatably mounted in the housing for storing the measuring line, and a measuring drum rotatably mounted in the housing and including a surface in contact with the measuring line, whereby movement of the measuring line through the opening of the housing causes rotation of the measuring drum. The electronic measuring device also desirably includes a disc coupled with the measuring drum for rotating simultaneously with the measuring drum, an optical sensor in communication with the disc for generating signals related to rotation of the disc, and electronic circuitry in communication with the optical sensor for processing the generated signals so as to calculate a length of the measuring line passing through the opening of the housing.

Other preferred embodiments of the present invention include an electronic tape measure comprising a housing adapted to store measuring line, the housing having an opening for drawing the measuring line from the housing, and a measuring drum mounted in the housing and including a non-slip surface in engagement with the measuring line, wherein movement of the measuring line rotates the measuring drum. The electronic tape measure also includes a disc coupled with the measuring drum for rotating simultaneously with the measuring drum, an optical sensor in communication with the disc for recording data related to rotation of the disc, and electronic circuitry in communication with the optical sensor for processing the recorded data so as to calculate a length of the measuring line passing through the opening of the housing. This particular embodiment also preferably includes a storage spool rotatably mounted in the housing for receiving the measuring line, and a crank assembly connected with the storage spool for rotating the storage spool so as to wind the measuring line about the storage spool.

Still other preferred embodiments of the present invention include a digital tape measure having a housing containing a measuring line, and a rotatable measuring drum in engagement with the measuring line so that movement of the measuring line causes rotation of the measuring drum. The digital tape measure also desirably includes a rotatable disc coupled with the measuring drum for rotating simultaneously with the measuring drum, an optical sensor in communication with the disc for compiling data related to rotation of the disc, and electronic circuitry in communication with the optical sensor for processing the compiled data so as to calculate a length of the measuring line drawn from the housing. The optical sensor desirably includes a light-generating element opposed by a light-sensing element that is adapted to sense light emitted from the light-generating element. The optical sensor desirably generates a first signal when light from the light-generating element reaches the light-sensing element, and a second signal when the light from the light-generating element is blocked by one of the teeth of the disc.

These and other preferred embodiments of the present invention will be described in more detail below.

DETAILED DESCRIPTION OF PREFERRED EMBODIMENTS

Figure 1:
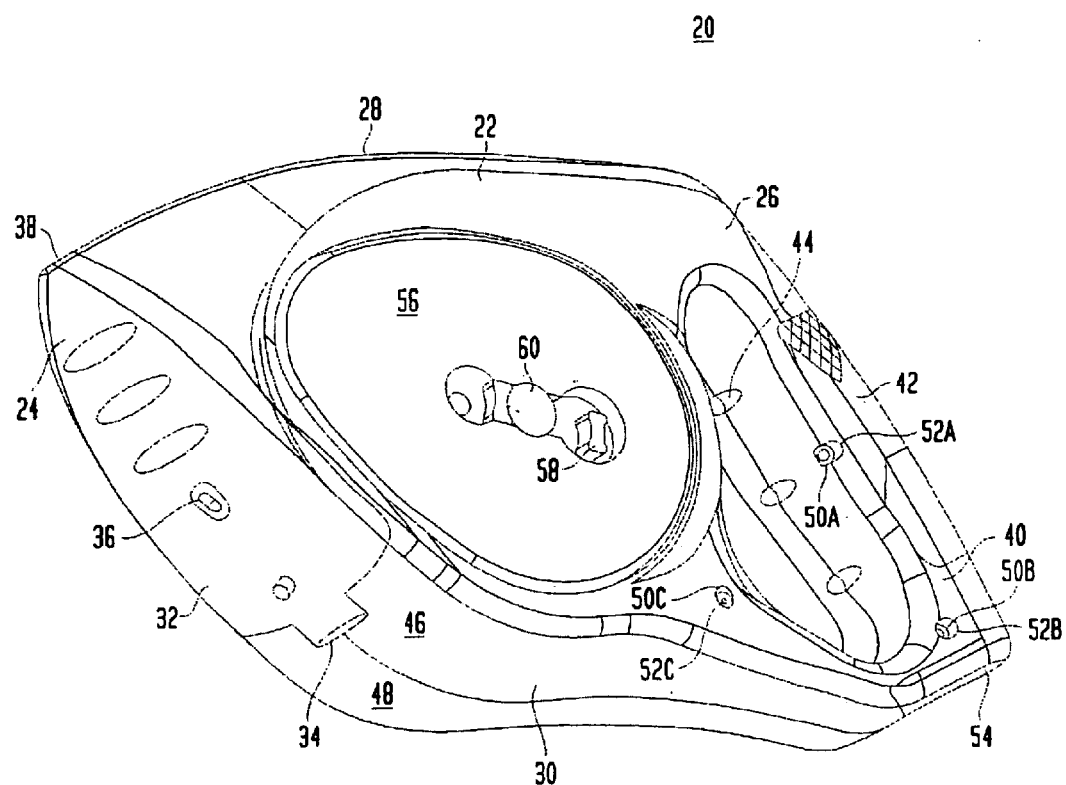
FIG. 1 shows a side view of a digital tape measure, in accordance with certain preferred embodiments of the present invention.

FIG. 1 shows a digital tape measure 20 including a housing 22 having a front 24, a rear 26, atop a bottom 30. In certain preferred embodiments, housing 22 is made of molded plastic. Housing 22 includes a hingeable front cover 32 movable between open and closed positions. Hingeable front cover 32 includes a cutting element 36 attached thereto for selectively cutting or trimming a measuring line (not shown). Hingeable front cover 32 includes an opening 38 through which the measuring line can be drawn from housing 22.

Housing 22 also includes a handle 40 that extends along rear 26 between the top and bottom 28, 30 of housing 22. Handle 40 is preferably integrally molded with the housing 22. A gripping surface 42 is preferably secured over an exterior surface of handle 40 for improving the gripability of the handle. The handle 40 also preferably includes one or more finger grooves 44 for enhancing a user's grip.

Housing 22 preferably includes a first molded part 46 and a second molded part 48 that are assembled together and held together by screws 50, 50A, 50B and 50C passed through openings 52A, 52B and 52C formed in first molded part 46. Screws 50A–50C are preferably anchored in threaded apertures (not shown) formed in second molded part 48 for reliably securing first and second molded parts 46, 48 together.

Housing 22 also preferably includes a battery compartment cover 54 that selectively closes a battery compartment opening 55 at a lower end of handle 40. Housing 22 also preferably includes a removable side cover 56 that covers a well formed in housing 22 that is adapted to receive a measuring line storage spool (not shown). Removable side cover 56 includes a slidable lock 58 that may be urged towards a central knob 60 for releasing side cover 56 from its attachment with housing 22.

Figure 2:
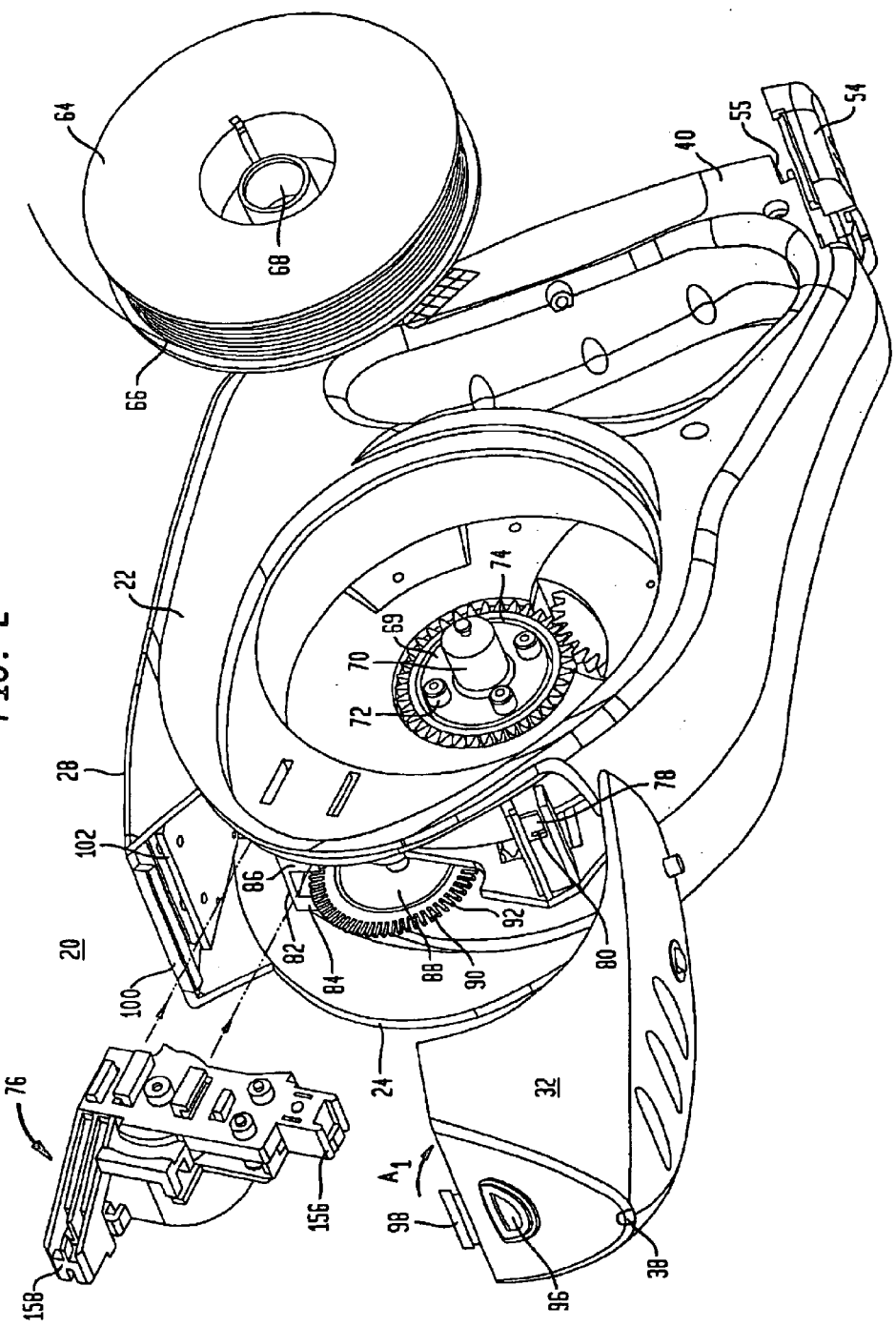
FIG. 2 shows a partially exploded view of the digital tape measure shown in FIG. 1.

FIG. 2 shows a partially exploded view of the digital tape measure of FIG. 1, after hingeable front cover 32 has been opened and side cover 56 (FIG. 1) has been detached from housing 22. The well 62 is adapted to receive a storage spool 64 having measuring line 66 wound thereon. Spool 64 has a central opening 68 that is mounted over spool gear 69 having a central shaft 70 and spaced projections 72 that are engageable with similarly shaped, spaced depressions (not shown) formed on an underside of storage spool 64. The spaced projections 72 provide positive alignment of storage spool 64 with gear 74.

Digital tape measure 20 also includes a measuring drum assembly 76 insertable into the front 24 of housing 22 when hingeable front cover 32 is in the open position shown in FIG. 2. As will be described in more detail below, measuring drum assembly 76 is designed to receive a free end of measuring line 66 supplied from storage spool 64. Measuring drum assembly 76 includes a series of guides for threading the measuring line 66 therethrough. Housing 22 also includes a stationary guide 78 having an opening 80 extending therethrough for engaging and guiding the measuring line 66 after the measuring line has passed through a front end of measuring drum assembly 76.

The digital measuring tape also includes an optical sensor 82 including a light generating element 84 and a light sensing element 86 that are directed towards one another on opposite faces of a rotatable disc 88 having teeth 90 at the periphery thereof and gaps 92 between the teeth 90. The teeth 90 are preferably evenly spaced from one another.

Hingeable front cover 32 includes a depressible button 96 and a projection 98 integrally connected to button. When button 96 is depressed, projection 98 moves in an arcuate path shown by arrow $A_1$. When hingeable front cover 32 is moved in a clockwise direction toward the top 28 of housing 22, projection 98 is securable under locking bar 100 for holding hingeable front cover 32 in the closed position. In order to open hingeable front cover 32 once again, button 96 is depressed so as to uncouple projection 98 from engagement with locking bar 100.

Digital measuring tape 20 also includes a printed circuit board 102 secured within housing 22. The printed circuit board 102 preferably includes microelectronic elements (not shown) such as microprocessors and memory devices for controlling electronic circuitry coupled with printed circuit board 102. The printed circuit board 102 is preferably in communication with optical sensor 82 for obtaining data from optical sensor 82 when disc 88 rotates as measuring line 66 is drawn through the opening 38 of hingeable cover 32.

Figure 3:
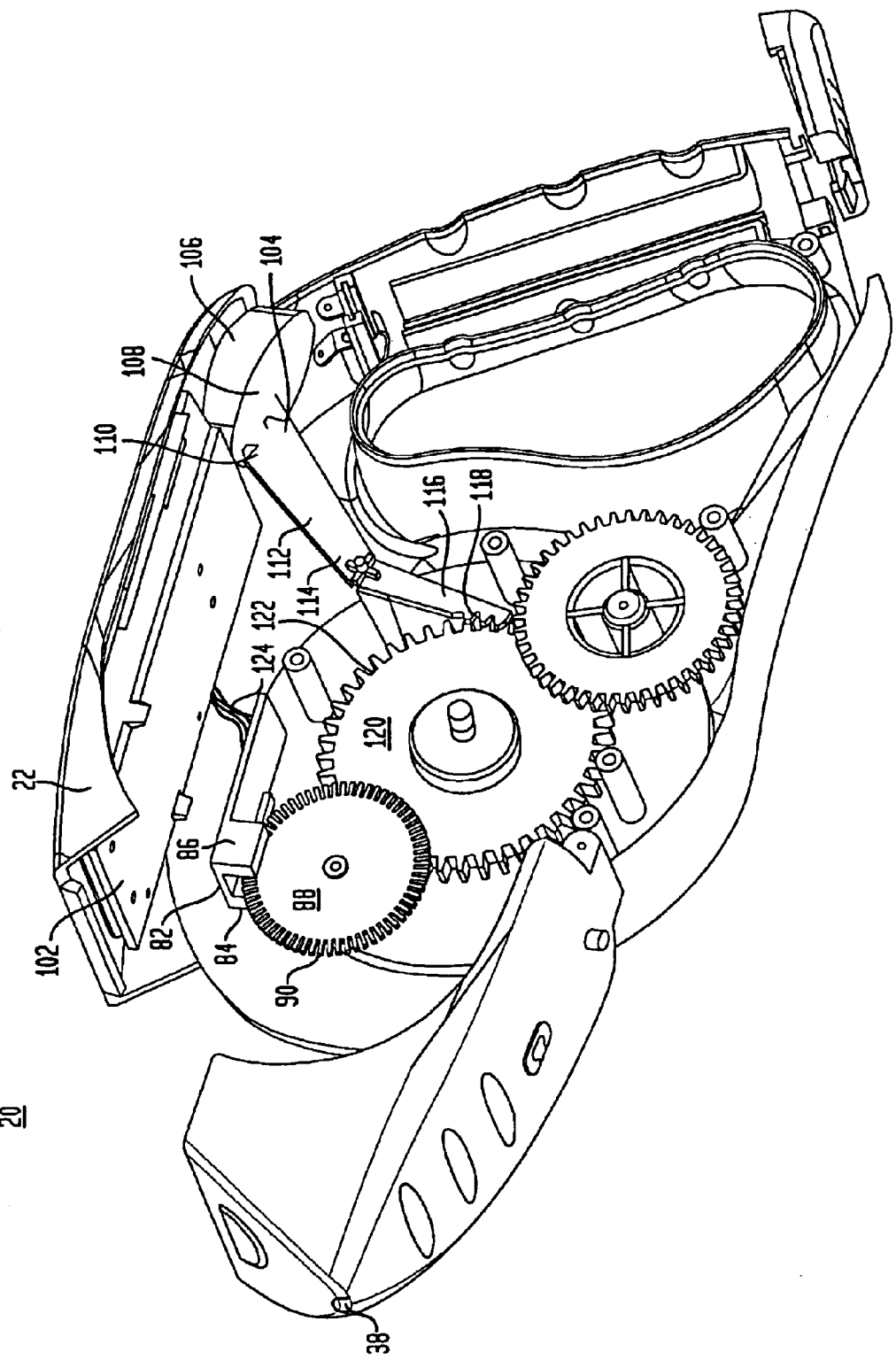
FIG. 3 shows a cross-sectional view of the digital tape measure shown in FIGS. 1 and 2, including an optical sensor secured in a housing.

Referring to FIG. 3, digital tape measure 20 also includes a brake 104 having a pivotable brake knob 106 with an underside 108 coupled with a first end 110 of a first lever 112. First lever 112 also includes a lower end 114 coupled with a second lever 116. The second lever 116 has a lower end with teeth 118 with teeth that mesh with crank assembly gear 120 having teeth 122. The brake knob 106 is pivotable between a first unlocked position and a second locked position. In the first unlocked position, the teeth 118 of second lever 116 are remote from the teeth 122 of crank assembly gear 120 so that crank assembly gear is free to rotate. In a second locked position shown in FIG. 3, the teeth 118 of second lever 116 engage the teeth 122 of crank handle gear 120 so that crank handle gear 120 cannot rotate. In operation, the brake 104 is movable back and forth between the first unlocked position and the second locked position for selectively locking movement of the crank handle gear 120.

FIG. 3 also shows rotatable disc 88 mounted in housing 22 for rotating in response to movement of a measuring drum, as will be described in more detail below. The teeth 90 at the periphery of disc 88 are designed to pass between light generating element 84 and light sensing element 86 of optical sensor 82. Optical sensor 82 is preferably in communication with printed circuit board 102 via communication line 124.

Figure 4:
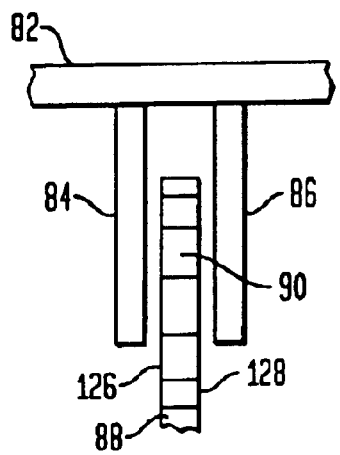
FIG. 4 shows a front end view of the optical sensor shown in FIG. 3.
Figure 5:
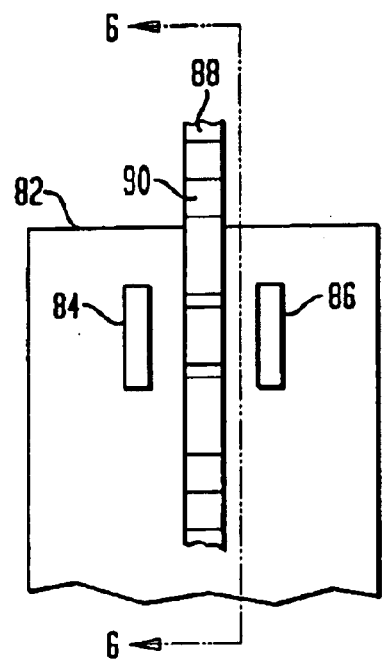
FIG. 5 shows a bottom view of the optical sensor shown in FIG. 4.

FIGS. 4 and 5 show a front end view of optical sensor 82 including light generating element 84 and light sensing element 86. Disc 88 is provided between light generating element 84 and light sensing element 86. Disc 88 has a first face 126 facing toward light generating element 84 and a second face 128 facing toward light sensing element 86. The teeth 90 at the periphery of disc 88 are adapted to pass between the light-generating element 84 and the light-sensing element 86 as disc 88 rotates.

Figure 6:
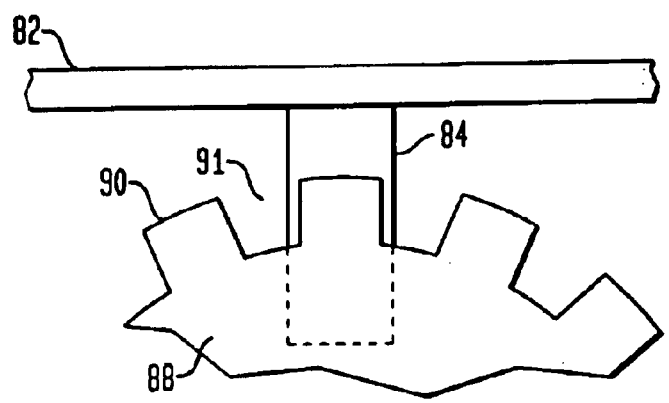
FIG. 6 shows a sectional view of the optical sensor taken along line VI—VI of FIG. 5.

FIG. 6 shows the teeth 90 of disc 88 passing by light generating element 84. When one of the gaps 91 of disc 88 is aligned between the light generating element and the light-sensing element, light generated by light generating element 84 is able to pass through the gap 91 and be sensed by light sensing element 86 (not shown). When one of the teeth 90 is positioned between the light generating element and the light sensing element, as shown in FIG. 6, the light emitted from the light generating element 84 is not sensed by the light sensing element. In operation, optical sensor 82 generates a first signal when the light passes through one of the gaps 91 and a second signal when the light is blocked by one of the teeth 90. The first and second signals are processed by the operational circuitry to determine the length of the measuring line drawn from the housing.

Figure 7A:
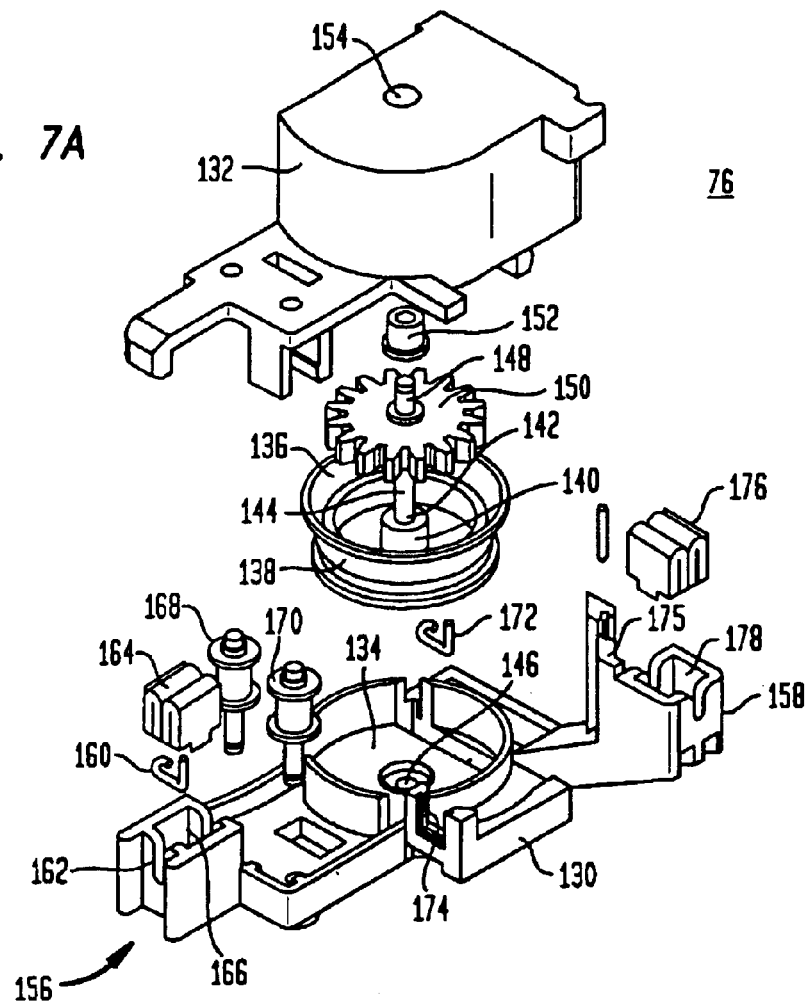
FIG. 7A shows an exploded view of measuring drum assembly for a digital tape measure, in accordance with certain preferred embodiments of the present invention.

FIG. 7A shows an exploded view of a measuring drum assembly 76, in accordance with certain preferred embodiments of the present invention. Measuring drum assembly 76 includes a base member 130 and a cap 132 securable over the base member. The base member 130 includes a centrally located well 134 adapted to receive measuring drum 136 having an annular surface 138 adapted to engage the measuring line unwound from the storage spool (FIG. 2). The measuring drum 138 includes a central hub 140 having an opening 142 adapted to receive shaft 144. Shaft 144 has a lower end (not shown) passable through an opening 146 in the bottom of well 134 for supporting rotation of measuring drum 136, and an upper end 148 having a drive gear 150 mounted thereon. The drive gear 150 rotates at the same rate as measuring drum 136. A bearing 152, mountable at the upper end 148 of shaft 144 is insertable into a top wall aperture 154 of cap 132.

Referring to FIGS. 2 and 7A, base member 130 includes an upstream end 156 and a downstream end 158. When the measuring drum assembly 76 is secured within the housing 22, the upstream end 156 is positioned adjacent the stationary guide 78 and the downstream end 148 is positioned adjacent the opening 38 of hingeable front cover 32 when the hingeable front cover is in the closed position. Base member 130 includes a first stationary line guide 160 securable in U-shaped groove 162 and a first line cleaner guide 164 securable in cup 166. Bottom assembly 130 also includes two roller guides 168, 170 for guiding movement of the measuring line. Base assembly 130 also includes a second stationary guide 172 securable in second U-shaped groove 174, a second line cleaner guide 176 secured in a second cup 178 adjacent the downstream end 158 of base member 130, and a third stationary guide 179 between the second stationary guide 172 and second line cleaner guide 176.

Figure 7B:
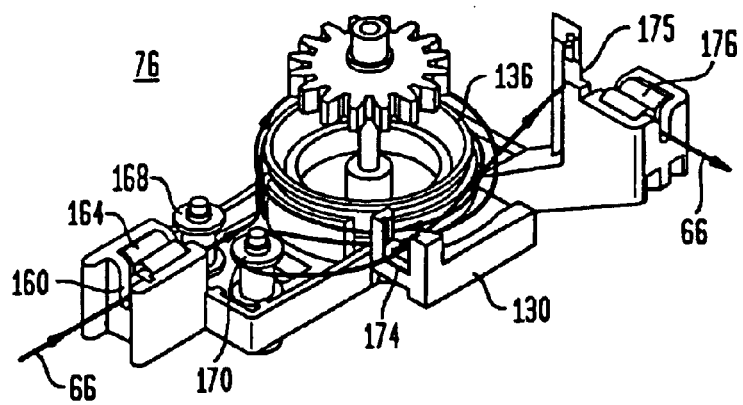
FIG. 7B shows the measuring drum assembly of FIG. 7A in a partially assembled state with a measuring line threaded therethrough.

FIG. 7B shows measuring line 66 threaded through the base member 130 of measuring drum assembly 76. The measuring line is drawn from storage spool 64. The measuring line is threaded in the following pattern: first stationary line guide 160, first line cleaner guide 164, first roller guide 168, wrapped approximately one and two-thirds times around measuring drum 136, around second roller guide 170, through second stationary line guide 174, through third stationary line guide 175 and through second line cleaner guide 176 at downstream end 158. The measuring line 66 is then passed through the opening 38 in hingeable front cover 32 (FIG. 3).

Figure 7C:
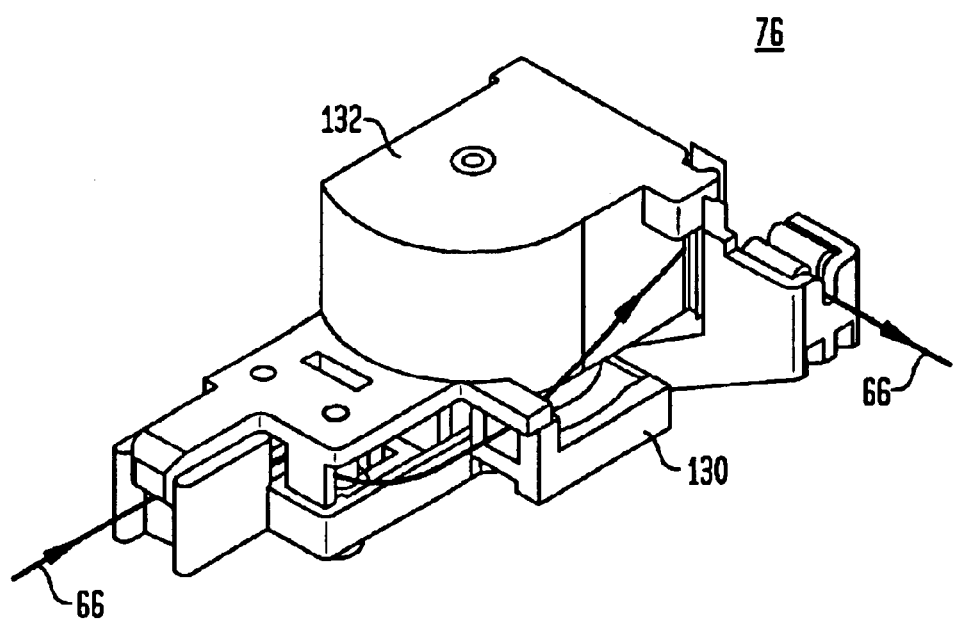
FIG. 7C shows a perspective view of the measuring drum assembly of FIG. 7A in a fully assembled state.

Referring to FIGS. 7A and 7C, after the measuring line 66 has been threaded through the measuring drum assembly 76, the top cover 132 and base member 130 are assembled together, such as by snap-fitting the top cover 132 and base member 130 together. The fully assembled measuring drum assembly 76 is insertable into the front end of housing 22 as shown in FIG. 2.

Figure 8:
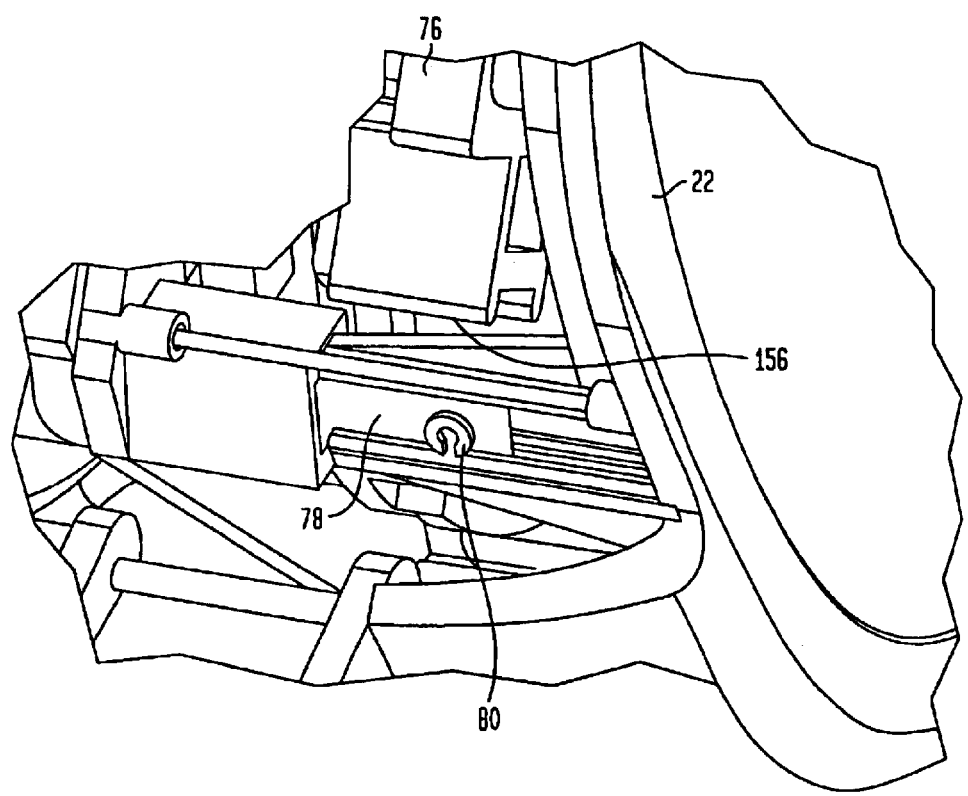
FIG. 8 shows an expanded view of a stationary guide for a measuring line, in accordance with certain preferred embodiments of the present invention.

FIG. 8 shows an expanded view of the stationary guide 78 shown in FIG. 2. The stationary guide 78 includes an opening 80 that provides a guide for the measuring line (not shown) between the storage spool and the upstream end 156 of measuring drum assembly 76 when the measuring drum assembly is inserted into housing 22.

Figure 9:
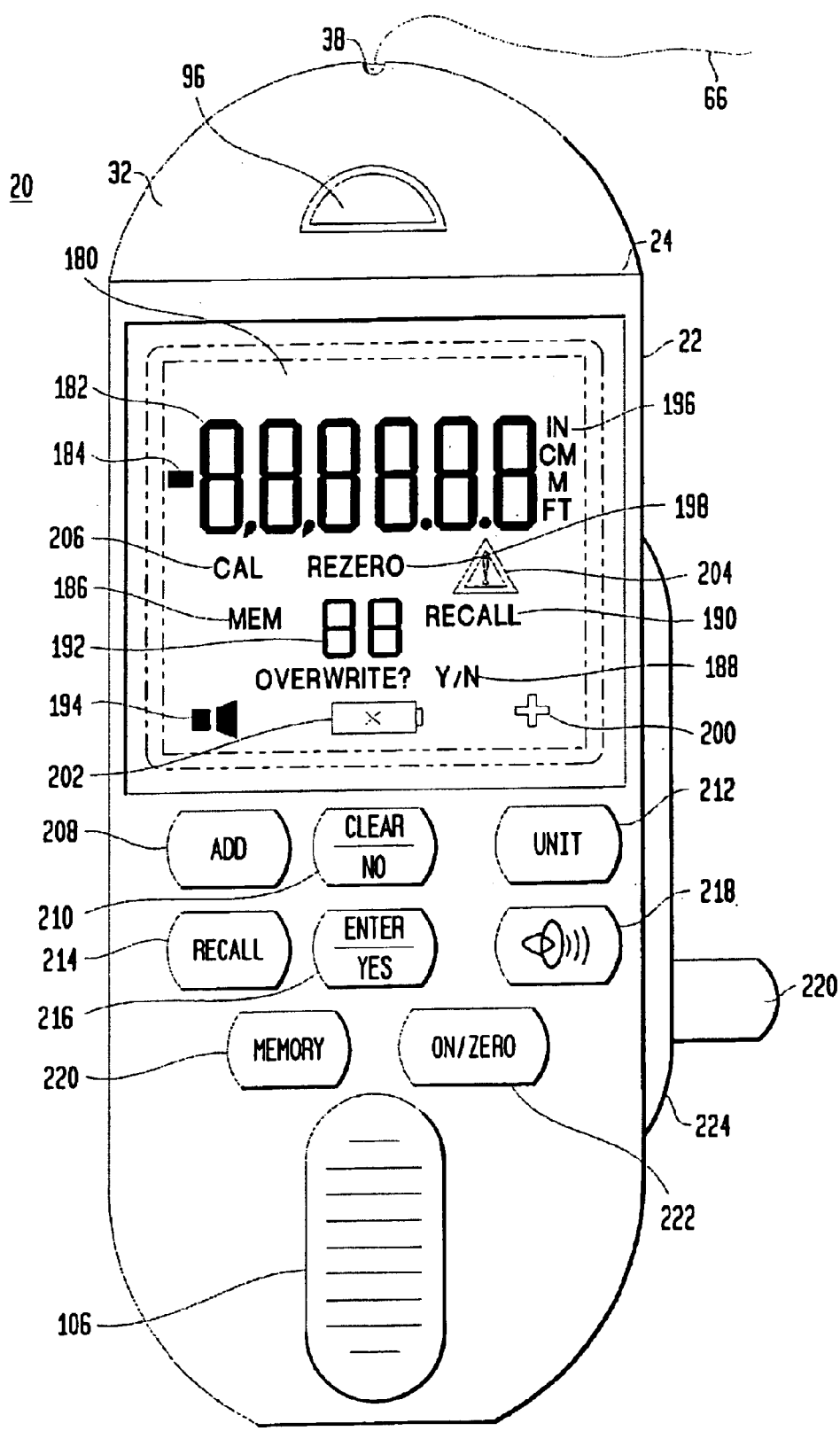
FIG. 9 shows a top plan view of a control panel for a digital tape measure, in accordance with certain preferred embodiments of the present invention.

FIG. 9 shows a plan view of the top 28 of housing 22. The housing 22 includes hingeable front cover 32 and depressable button 96 for enabling hingeable front cover to be swung away from a front end of housing 22. Hingeable front cover also includes opening 38 that enables measuring line 66 to be drawn therethough.

The housing 22 has a visual display 180 such as a liquid crystal display. Visual display 180 includes a main readout 182 providing a six-digit numeric with comma and decimal point for decimals. The main readout 182 provides current measuring line readings and displays the value of memory and recall locations. Visual display 180 also includes a negative sign 184 that is displayed when the value on the main readout 182 is negative. The negative sign indicates that the measuring line is retracted from a "rezero" position. Visual display 180 also includes a memory indicator 186 that is displayed when memory is selected. The memory indicator 186 indicates which of the 15 memory storage locations is being used and when all of the 15 memory locations are "full." At that point, a prompt "overwrite? Y/N" indicator 188 will illuminate. If a user desires to overwrite the previously stored memory at that memory location, the user will press the yes button below.

The visual display also includes a recall indicator 190 that is displayed when recall is selected. The recall indicator 190 indicates the last stored measurement and the corresponding memory location (1–15). Pressing the recall button again will step through to the next measurement stored in memory. Visual display 180 also includes location indicator 192 that displays the storage location of the saved value or the recall value in memory. Visual display 180 also has a sound activated indicator 194 that indicates when the sound function has been toggled to the "on" position. Unit indicator 196 denotes the type of units that are being displayed in the main readout 182. Rezero indicator 198 displays when the "On/Zero" button is pressed to rezero the display. Overwrite option indicator 188 is illuminated in the event that a user attempts to save a measurement in an occupied memory location. At that point, the user is prompted to confirm the action with the overwrite option indicator 188. Once a "yes" or "no" is selected, the overwrite option indicator is turned off.

The visual display 180 also includes an add indicator, represented by the "+" sign 200, that confirms that the user is in the "add" mode. Low battery indicator 202 illuminates when battery voltage is below a predetermined level, such as 4.8 volts. Overspeed indicator 204 illuminates when the digital tape measure will not function properly due to the measuring line 66 moving at a speed of over 10 feet per second. If the overspeed indicator 204 illuminates, a user should remeasure a length, while insuring that the measuring line does not move at a speed of over 10 feet per second. The calibration indicator 206 is displayed when the "On/Zero" button is depressed and held for five seconds. At that point, the digital tape measure 20 enters calibration mode.

Digital tape measure 20 also includes a series of data entry keys for controlling operation of the device. The data entry keys include add button 208, Clear/No button 210, unit button 212, recall button 214, Enter/Yes button 216, sound activating button 218, memory storage button 220 and On/Zero button 222. The housing 22 also includes brake button 106 that may be toggled back and forth between a locked position and an unlocked position in which the measuring line 66 can be drawn from the housing 22.

Figure 10:
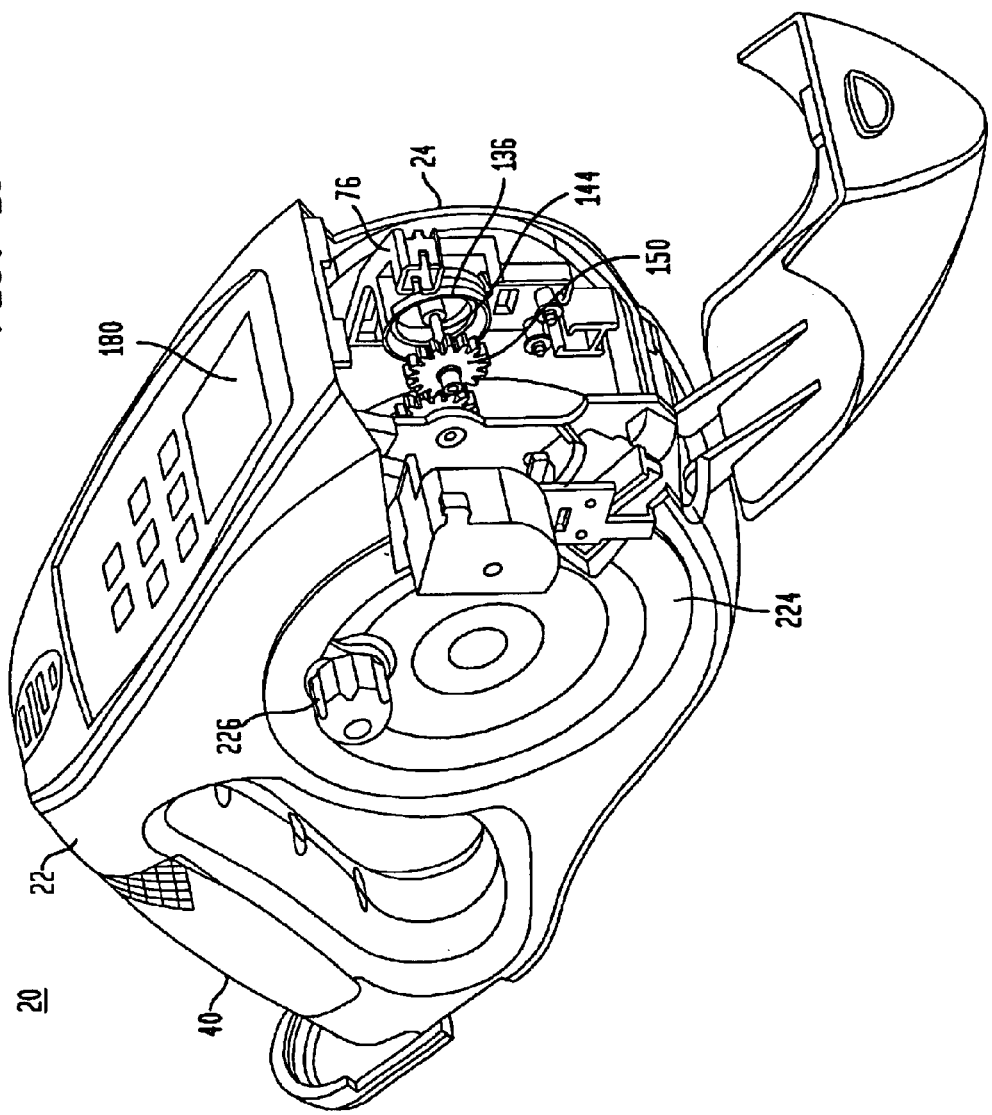
FIG. 10 shows a perspective view of the digital tape measure shown in FIG. 9.
Figure 11A:
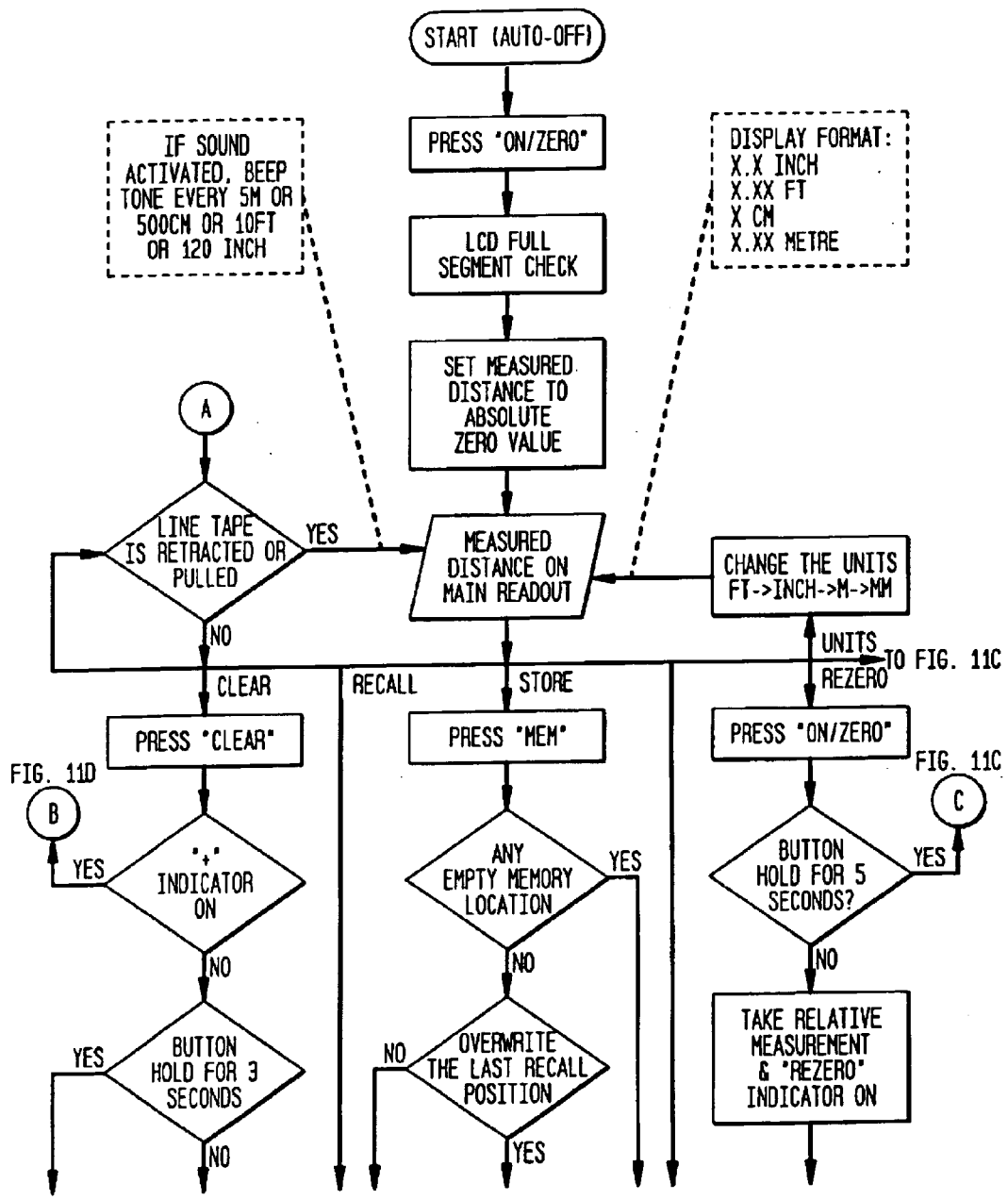
FIGS. 11A–11D show subroutines for operational circuitry of a digital tape measure, in accordance with certain preferred embodiments of the present invention.
Figure 11B:
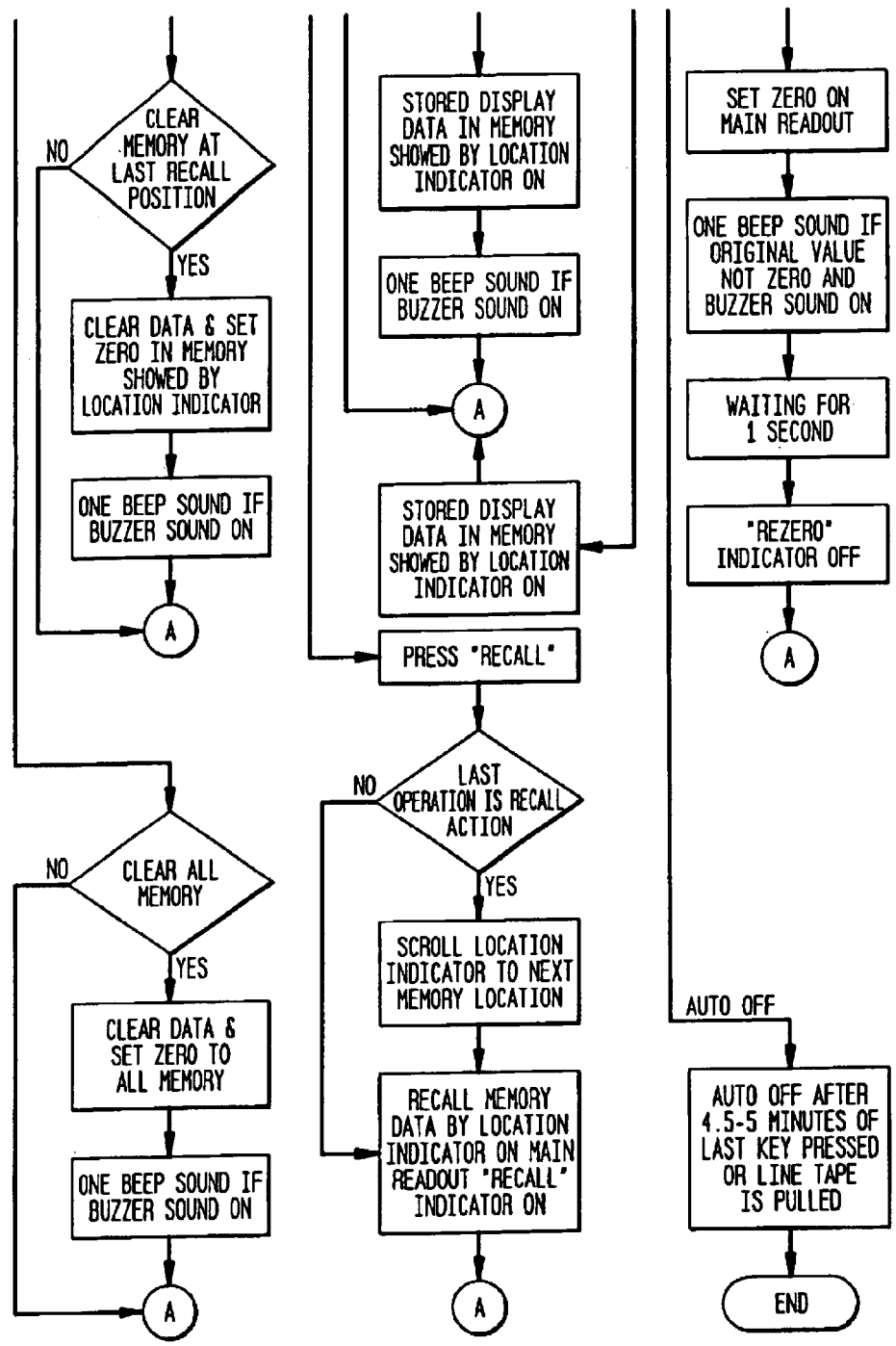
Figure 11C:
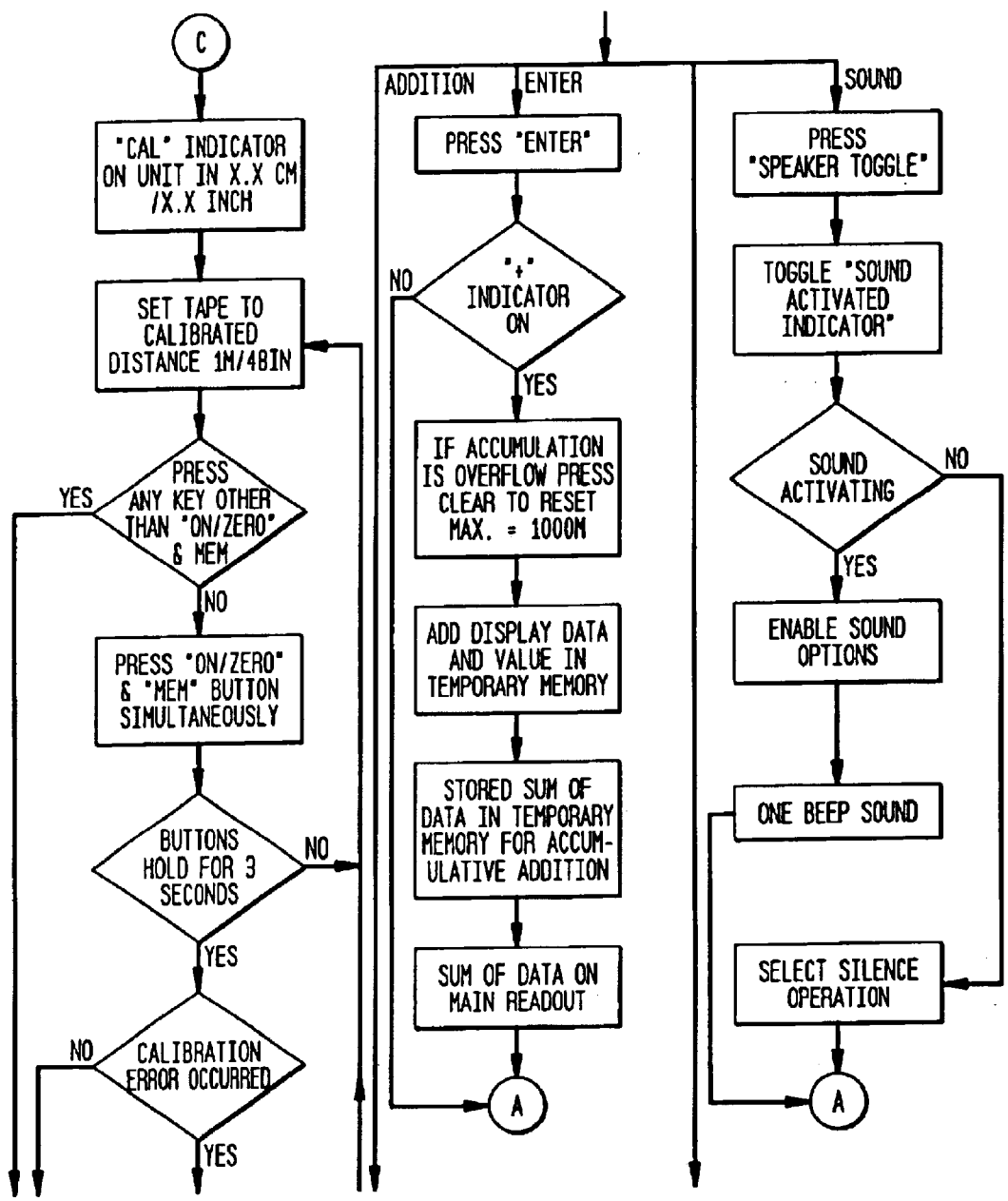
Figure 11D:
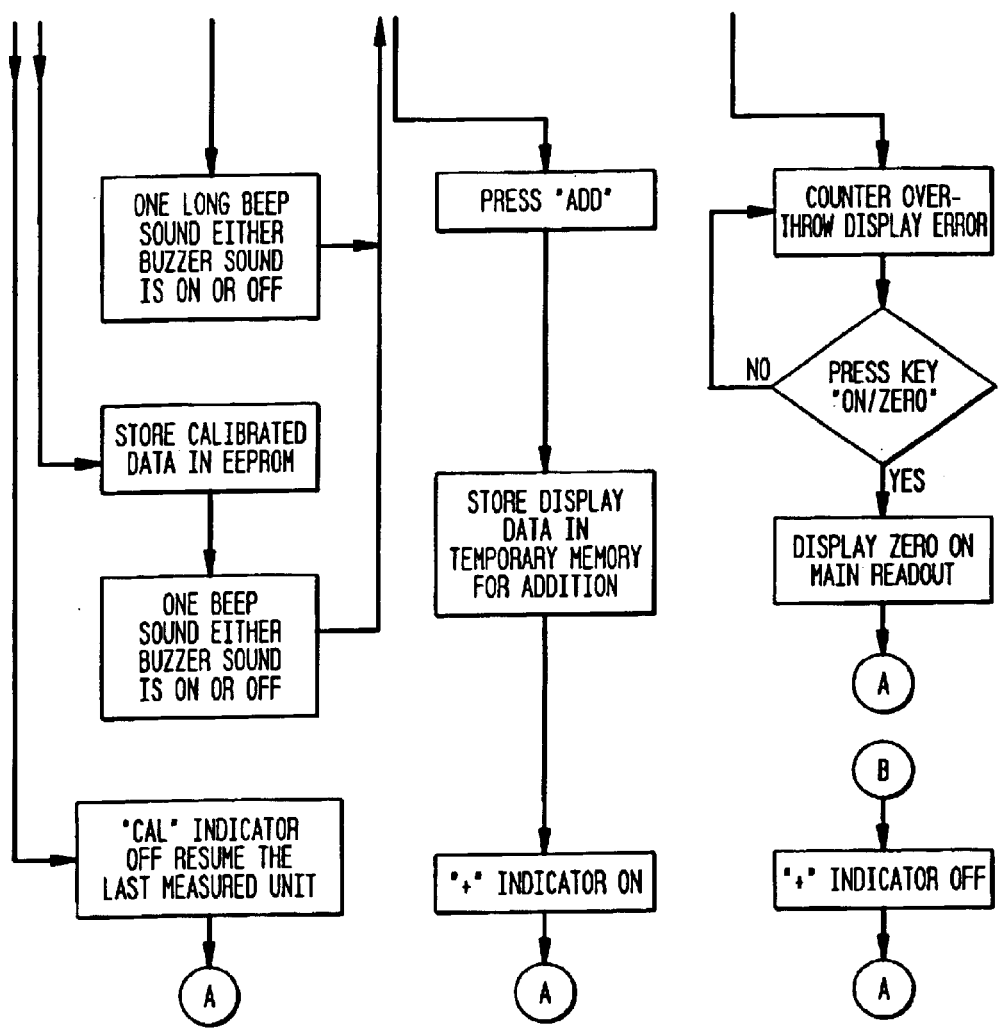

Referring to FIGS. 9 and 10, the tape measure also includes a crank assembly 224 having a crank handle 226 that is coupled with the storage spool gear 69 for rotating storage spool 64 to wind measuring line 66 about storage spool 64. When the brake assembly 106 is moved into the locking position, the crank assembly 224 is locked in place, thereby preventing further movement of the measuring line.

Figure 12A:
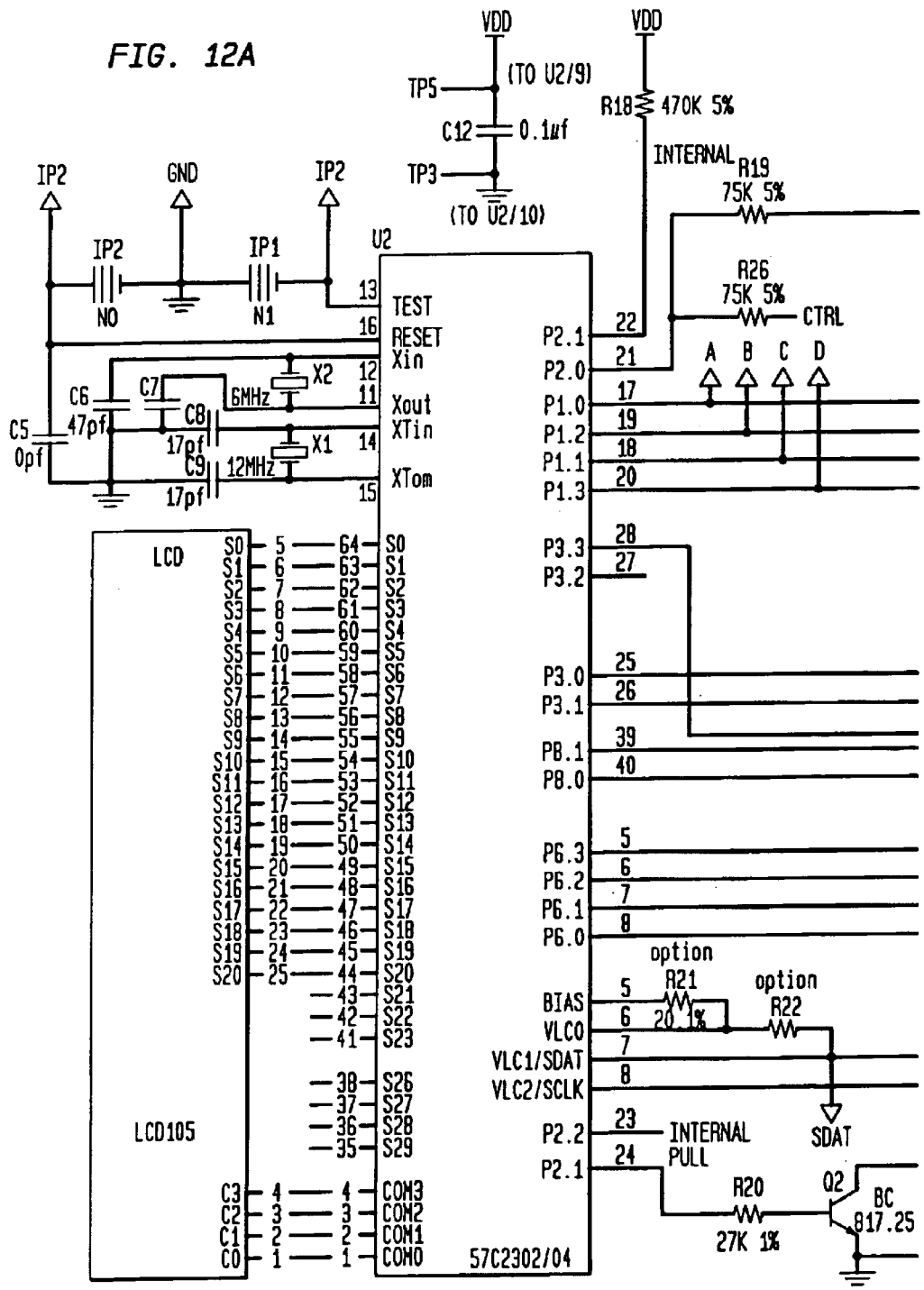
FIG. 12 shows a schematic of electronic circuitry of used to perform the subroutines shown in FIGS. 11A–11D.
Figure 12B:
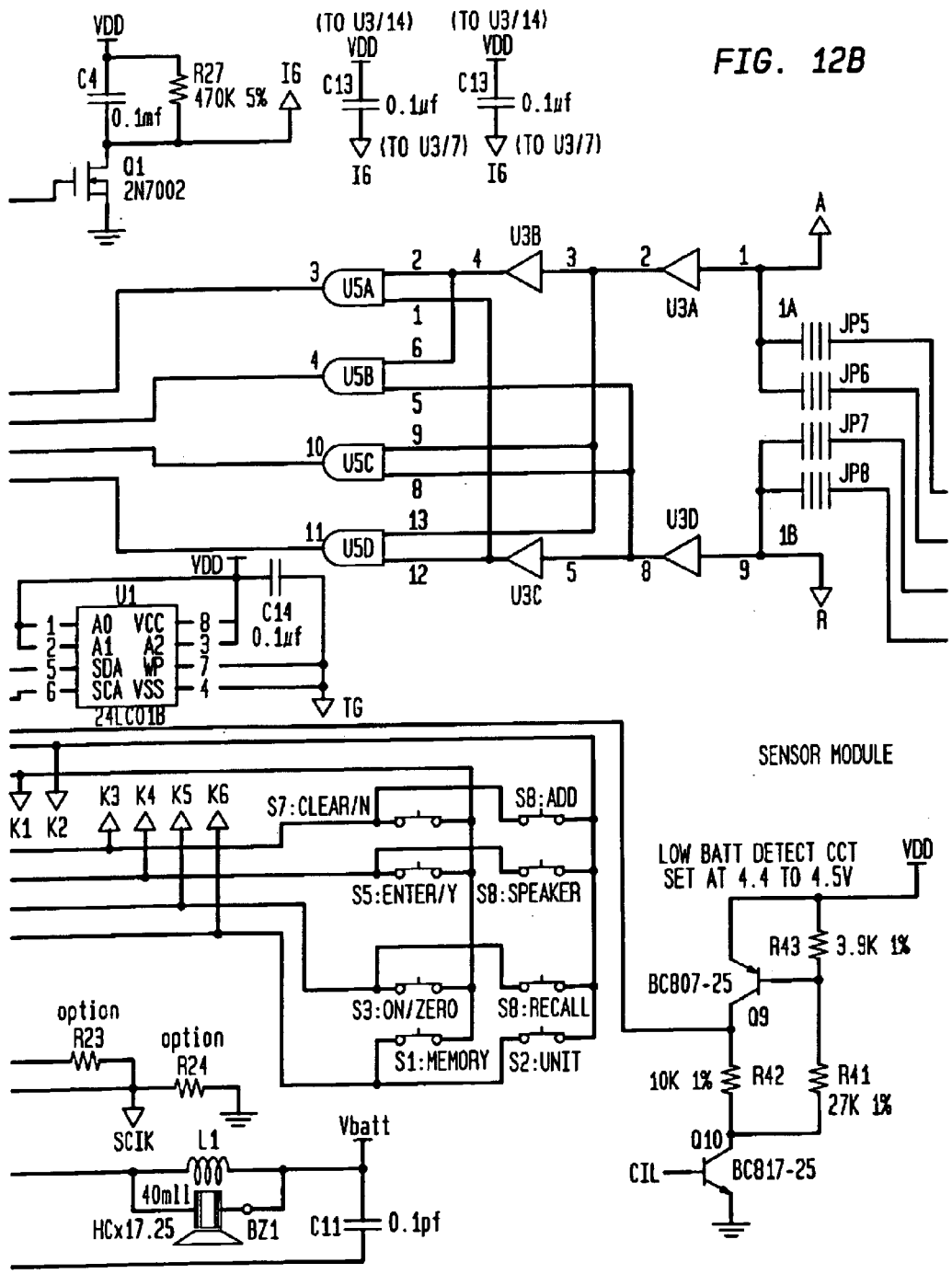
Figure 12C:
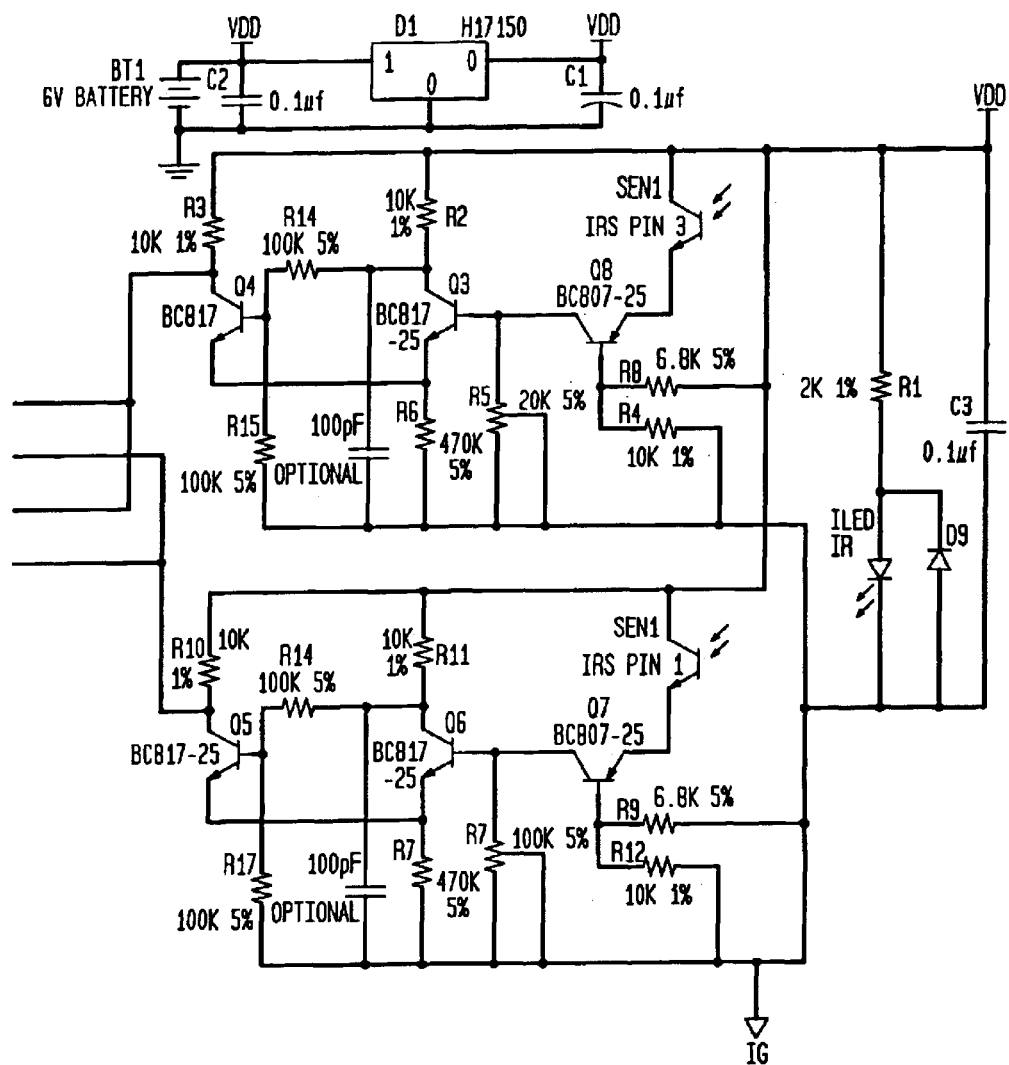

FIGS. 11A–11D show preferred logic subroutines used for operating the digital tape measure. FIG. 12 shows electronic circuitry mounted atop the printed circuit board (FIG. 2) for performing the steps shown in the logic subroutines of FIGS. 11A–11D.

Although the invention herein has been described with reference to particular embodiments, it is to be understood that these embodiments are merely illustrative of the principles and applications of the present invention. It is therefore to be understood that numerous modifications may be made to the embodiments described herein and that other arrangements may be devised without departing from the spirit and scope of the present invention as defined by the appended claims.

What is claimed is:

1. A hand-held digital measuring instrument comprising:
a housing containing a measuring line;
a rotatable measuring drum in engagement with said measuring line so that movement of said measuring line causes rotation of said measuring drum;
a storage spool mounted in said housing for storing said measuring line;
a crank assembly having a crank handle coupled with said storage spool for rotating said storage spool for winding said measuring line about said storage spool;
a rotatable disc coupled with said measuring drum for rotating simultaneously with said measuring drum;
an optical sensor in communication with said disk for compiling data related to rotation of said disk;
electronic circuitry in communication with said optical sensor for processing the compiled data so as to calculate a length of said measuring line drawn from said housing;
said housing including a well adapted to receive said storage spool; and a removable side cover attachable to said housing over said well, said side cover including a slideable lock for selectively detaching said side cover from said housing for uncovering said well, wherein said storage spool is rotatable for winding and unwinding said measuring line from said storage spool.

2. The digital measuring instrument as claimed in claim 1, wherein said optical sensor includes a light generating element opposed by a light sensing element that is adapted to sense light emitted from said light generating element.

3. The digital measuring instrument as claimed in claim 2, wherein said disc has a plurality of teeth at a peripheral edge thereof that pass between said light generating element and said light emitting element during rotation of said disc.

4. The digital measuring instrument as claimed in claim 3, wherein said plurality of teeth are evenly spaced from one another by gaps extending therebetween.

5. The digital measuring instrument as claimed in claim 4, wherein said optical sensor generates a first signal when one of said teeth blocks said light from reaching said light sensing element and a second signal when said light is detected by said light sensing element after passing through one of said gaps.

6. A hand-held digital measuring instrument comprising:
a housing containing a rotatable storage spool;
a measuring line windable about said storage spool;

a measuring drum rotatably mounted in said housing and including a surface in contact with said measuring line, wherein movement of said measuring line causes rotation of said measuring drum;

a disc coupled with said measuring drum, wherein rotation of said measuring drum causes simultaneous rotation of said disc;

an optical sensor in communication with said disc for compiling data related to rotation of said disc; and electronic circuitry in communication with said optical sensor for processing said compiled data so as to calculate a length of said measuring line drawn from said housing; and a front cover hingeably connected to said housing, said front cover including an opening through which said measuring line is drawn from said housing and a cutting element for selectively cutting said measuring line.

7. The digital measuring instrument as claimed in claim 6, wherein said housing includes a digital display adapted to display the calculated length of said measuring line drawn from said housing.

8. The digital measuring instrument as claimed in claim 6, wherein said disc includes a peripheral edge having a plurality of teeth evenly spaced from one another.

9. The digital measuring instrument as claimed in claim 8, wherein said teeth define evenly spaced gaps therebetween.

10. The digital measuring instrument as claimed in claim 8, wherein said optical sensor is in substantial alignment with said teeth of said disc.

11. The digital measuring instrument as claimed in claim 10, wherein said optical sensor includes a light generating element directed toward a first face of said disc and a light sensing element directed toward a second face of said disc, wherein said light generating element and said light sensing element oppose one another and are in substantial alignment with one another.

12. The digital measuring instrument as claimed in claim 11, wherein said disc is aligned with said light generating and light sensing elements so that said teeth of said disc pass between said light generating element and said light sensing element.

13. The digital measuring instrument as claimed in claim 12, wherein said light generating element is a light emitting diode (LED) and said light sensing element is a phototransistor.

14. The digital measuring instrument as claimed in claim 13, wherein said phototransistor generates a first pulse signal when light from said light generating element passes through one of said gaps between said teeth of said disc and a second pulse signal when said light from said light generating element is blocked from reaching said light sensing element by one of said teeth of said disc.

15. The digital measuring instrument as claimed in claim 6, further comprising a printed circuit board including said electronic circuitry, wherein said electronic circuitry is analog circuitry.

16. The digital measuring instrument as claimed in claim 6, further comprising a printed circuit board including said electronic circuitry, wherein said electronic circuitry is digital circuitry.

17. The digital measuring instrument as claimed in claim 6, further comprising a microprocessor having one or more routines stored therein for operating said electronic circuitry.

18. The digital measuring instrument as claimed in claim 6, wherein said measuring line is flexible.

19. The digital measuring instrument as claimed in claim 6, wherein said measuring line is made of a material selected from the group consisting of cotton, metal synthetic material, nylon and polyester.

20. The digital measuring instrument as claimed in claim 6, wherein said measuring line is made of stainless steel.

21. The digital measuring instrument as claimed in claim 6, wherein said measuring line wound about said storage spool has a length of approximately 750–1500 m.

22. The digital measuring instrument as claimed in claim 6, wherein said housing includes a handle integrally formed therewith.

23. The digital measuring instrument as claimed in claim 6, further comprising a crank handle coupled with said storage spool for winding said measuring line around said storage spool.

24. The digital measuring instrument as claimed in claim 6, wherein said housing includes a well adapted to receive said storage spool and a removable side cover attachable to said housing over said well.

25. The digital measuring instrument as claimed in claim 24, wherein said side cover includes a slideable lock movable for detaching said side cover from said housing for selectively uncovering said well.

26. The digital measuring instrument as claimed in claim 6, further comprising a brake coupled with said storage spool for selectively locking said storage spool from rotating.

27. The digital measuring instrument as claimed in claim 6, further comprising a measuring drum assembly including said measuring drum, said measuring drum being mounted on a shaft carrying a first gear, wherein said first gear is mechanically coupled with a second gear which, in turn, is coupled with said disc so that rotation of said measuring drum causes rotation of said disc.

28. The digital measuring instrument as claimed in claim 27, wherein said measuring drum assembly includes at least one stationary guide, at least one roller guide and at least one cleaner guide.

29. The digital measuring instrument as claimed in claim 28, wherein said measuring drum assembly defines a threaded path for said measuring line as said measuring line passes between said storage spool and said opening of said housing.

30. The digital measuring instrument as claimed in claim 29, wherein said measuring drum assembly maintains a section of said measuring line under tension and in engagement with the non-slip surface of said measuring drum.

31. A hand-held electronic measuring instrument comprising:

a housing adapted to store a measuring line, said housing having a front cover with an opening for drawing said measuring line from said housing, said front cover including a cutting element for selectively cutting said measuring line;

a measuring drum mounted in said housing and including a surface in engagement with said measuring line, wherein movement of said measuring line rotates said measuring drum;

a disc coupled with said measuring drum for rotating simultaneously with said measuring drum;

an optical sensor in communication with said disc for recording data related to rotation of said disc; and electronic circuitry in communication with said optical sensor for processing the recorded data so as to calculate a length of said measuring line passing through the opening of said housing.

32. The electronic measuring instrument as claimed in claim 31, further comprising:
   a storage spool rotatably mounted in said housing for receiving said measuring line;
   a crank handle connected with said storage spool for rotating said storage spool so as to wind said measuring line about said storage spool; and
   a handle integrally connected with said housing, wherein said front cover is hingeably connected to said housing.

33. The electronic measuring instrument as claimed in claim 31, further comprising a printed circuit board containing said electronic circuitry.

34. The electronic measuring instrument as claimed in claim 31, wherein said electronic circuitry is adapted to recalibrate for said measuring line when said measuring line is made of different materials.

35. The electronic measuring instrument as claimed in claim 31, further comprising data entry keys for controlling operation of said electronic circuitry.

* * * * *